United States Patent
Clark et al.

(10) Patent No.: US 6,249,198 B1
(45) Date of Patent: Jun. 19, 2001

(54) MAGNETIC ACTUATOR

(75) Inventors: Richard Edward Clark, Sheffield; Stephen John Cook, Reading, both of (GB)

(73) Assignee: Huntleigh Technology PLC, Bedfordshire (GB)

( * ) Notice: Subject to any disclaimer, the term of this patent is extended or adjusted under 35 U.S.C. 154(b) by 0 days.

(21) Appl. No.: 09/485,815
(22) PCT Filed: Jun. 15, 1999
(86) PCT No.: PCT/GB99/01899
§ 371 Date: Feb. 15, 2000
§ 102(e) Date: Feb. 15, 2000
(87) PCT Pub. No.: WO99/66628
PCT Pub. Date: Dec. 23, 1999

(30) Foreign Application Priority Data

Jun. 16, 1998 (GB) .................................................. 98/12828

(51) Int. Cl.⁷ ..................................................... F04B 45/04
(52) U.S. Cl. .......................... 335/229; 335/222; 335/232; 335/235; 417/413.1; 310/36
(58) Field of Search ..................................... 335/229–235, 335/222; 310/36–39; 417/410.1, 412, 413.1

(56) References Cited

U.S. PATENT DOCUMENTS 5,013,223 * 5/1991 Takahashi et al. .................... 417/413
5,730,587 * 3/1998 Snyder et al. ..................... 417/413.1

* cited by examiner

Primary Examiner—Ray Barrera
(74) Attorney, Agent, or Firm—Brown Raysman Millstein Felder & Steiner LLP

(57) ABSTRACT

A magnetic actuator for reciprocating motion of a compressor diaphragm, piston or the like. The actuator comprises a stator with stator poles, excitation windings, and a backing plate. Non-magnetic support arms carry arced magnet poles and actuate a pair of compressed diaphragms. With the introduction of coil current, magnet poles are attracted to the central stator poles and repulsed by outer poles. A torque about pivot results and hence movement of arms with consequential actuation of the diaphragms. Performance is improved by increasing the flux produced by the electromagnet, thereby reducing flux leakage and fringing.

32 Claims, 4 Drawing Sheets

MAGNETIC ACTUATOR

BACKGROUND OF THE INVENTION

The present invention relates to a magnetic actuator. The actuator may be used in any applications where a member, for example a diaphragm, piston or plunger mounted for reciprocating motion in a predetermined direction is to be actuated.

Magnetic actuators are known and operate by interaction between a magnetic field and electric current flowing in one or more coils or windings. Typically magnetic actuators include an electromagnet incorporating a fixed core and a winding associated with the core, influencing a movable armature also of soft ferromagnetic material. The armature is one or more permanent magnets mounted on a movable actuator member connected to the member to be actuated, the diaphragm of a diaphragm pump, for example, with the permanent magnets influenced by an electromagnet.

GB 1557453 shows a known moving-magnet actuator, which consists of a fixed soft magnetic E-core stator assembly and two parallely magnetised permanent magnets arranged so that they present opposite poles towards the stator. The magnets are attached to a pair of independent soft magnetic lever arms which are supported by a pivot point and attached to the compressor. A single phase coil is mounted on the core central limb, and when excited by an alternating current, the magnetic arms produce an alternating torque and hence displacement.

The pair of permanent magnets are arranged so the axes of magnetization are in opposition and the motion of the two arms are synchronous, however, this can produce excessive vibration.

The above systems have proved successful for a number of products but their achievable performance is limited by a number of factors and there remain several disadvantages in terms of their manufacture. For example, large air-gaps are required for mechanical clearance due to tolerance problems and allowance for wear of the pivot points, resulting in significant flux leakage and the creation of stray fields. Additionally the use of soft magnetic arms, although improving the magnetic circuit over non-magnetic arms by acting as back-iron for the magnets, introduces problems of significant leakage and stray fields along the arms due to the extension of the soft magnetic component from the magnet back to the pivot point. The interaction of these soft magnetic arms with the coil excitation field also produces a reluctance or saliency force which distorts the excitation force profile. Another inherent feature of such devices is the presence of unbalanced magnetic forces which act in a perpendicular direction to the desired direction of motion due to the attraction of the magnet and the swing arm component towards the soft magnetic stator assembly. These forces can lead to excessive wear on the pivot system, particularly due to the cyclic nature of the force when in operation.

With regard to the electromagnet design in these actuators, current designs are typified by stators of parallel tooth and slot designs which have a large pole area to produce the correct torque-displacement profile. In order to simplify lamination cross section and to allow simple coil location the pole widths may be extended along the entire tooth length. This leads to excessive volumes of material. The material is therefore under utilised due to low levels of flux. Additionally, this feature leads to relatively narrow slots, and in order to accommodate sufficient copper windings whilst also accounting for 'creepage and clearance' the slots are typically deep and narrow, leading to slot leakage flux, i.e. flux produced by the coil which does not travel across the slot and is not available at the working air-gap for torque production.

SUMMARY OF THE INVENTION

The present invention seeks to improve the construction and performance of such systems.

The present invention provides an actuator for a member mounted for reciprocating motion in a predetermined direction, the actuator comprising a permanent magnet assembly linked to the member for movement therewith, the magnet assembly providing at least a pair of magnetic poles having similar or opposed pole faces adjacent one another and directed perpendicularly from the member and an electromagnet assembly having a respective pair of opposite poles located opposite so that energisation of the electromagnet produces movement of the permanent magnet poles towards one or other of the electromagnet poles wherein a magnetic backing member interlinks the poles of the permanent magnet to provide a flux return path.

In a preferred embodiment, the member to be actuated is a flexible diaphragm. The backing member acts to minimise leakage, maintain a useful magnet working point and offer an enhanced flux return path whilst reducing the normal force. Preferably, the magnetic backing member is mounted independently of the magnet and more preferably is located in a stationary position with respect to the electromagnet assembly, parallel to the electromagnet poles to define an air space in which the magnets are free to oscillate. Regardless of the magnet arrangement, the backing member improves performance by increasing the component of flux produced by the electromagnet assembly which interacts with the magnet in torque production so that for a given level of excitation a larger portion of flux will extend perpendicularly away from the electromagnet pole faces across the air gap to the backing member, whereas normally the flux would have a significant component of flux fringing, and flux not contributing to the torque production.

Preferably, the backing member comprises an axial dimension comparable with the magnet pole face axial dimension. Conveniently, the backing member may comprise a backing plate.

Preferably, the backing member may be held in a fixed position or more preferably an adjustable mounting may be used to allow adjustment of the air-gap between the backing member and the magnet poles to allow adjustment of the output by altering the magnetic circuit flux and hence torque.

In a preferred embodiment, the backing plate may be contoured with a radius or an approximation of a curve, as per the pole faces of the electromagnet, to maintain the desired air-gap over the moving magnet stroke. Alternatively the backing plate may be straight or 'v'-ed.

In the preferred embodiment the magnets may be arc segments (as shown in FIG. 6) which when combined with a radially contoured backing plate and pole faces, will achieve a minimum variation in air-gap and hence allow minimum mechanical clearance. The magnet segments may be radially or diametrically magnetised. However, for many instances, rectangular magnets may be preferred.

Preferably, the link between the magnet assembly and the diaphragm comprises pivotable arms. More preferably, the arms support the pair of magnetic poles respectively.

Preferably, the magnets may be mounted such that the magnetic-air gap is not extended.

Preferably, the arms may be non-magnetic, thereby avoiding the problems of leakage and stray fields along the arms associated with magnetic arms, due to the extension of the soft magnetic component from the magnet back to the pivot point.

The use of non-magnetic arms allows the use of injection or compression moulded plastics to be considered, hence allowing a reduction in moving mass, whilst maintaining the desired degree of rigidity and strength.

Preferably, the pivot, arm, and diaphragm components may be integrated into a single assembly, which significantly reduces component count and greatly increases reliability whilst minimising possible noise and vibration.

Further the mechanical linkage with the moulded diaphragm components may also be improved by ensuring an air tight seal. The use of injection moulded components also increases tolerance control which combined with the reduction of the unbalanced normal force allows minimisation of the mechanical clearance between magnet and electromagnet backing member and thereby minimising the magnetic air-gap, and improving the magnetic circuit efficiency.

In the preferred embodiment, the electromagnet assembly comprises an E stator including outer pole faces extending inwards from the outer teeth towards the centre pole. This configuration allows a wider shallower slot region to house the same volume of coil and hence reduced slot leakage.

In another preferred embodiment, the electromagnet assembly may comprise pole faces located remote from the rest of the assembly. For example, by extending the length of the teeth, the coil and back-iron may be located externally to a casing which houses the moving arm and magnet assemblies. Preferably, the pole faces of the stator may be moulded into the casing ensuring a good pneumatic and acoustic seal, without extending the effective magnetic air-gap. In addition to improving the pneumatic and acoustic sealing arrangement, this feature also has the advantage of placing the main source of heat i.e. the coil, remotely from the plastic components of the pneumatic system whose performance is strongly influenced by temperature. Further, the selection of coils for global markets with varying voltage levels, and the replacement of failed coils is more readily achieved.

BRIEF DESCRIPTION OF THE DRAWINGS

Examples of the present invention will now be described with reference to the accompanying drawings in which.

DETAILED DESCRIPTION OF THE PREFERRED EMBODIMENTS

Figure 1:
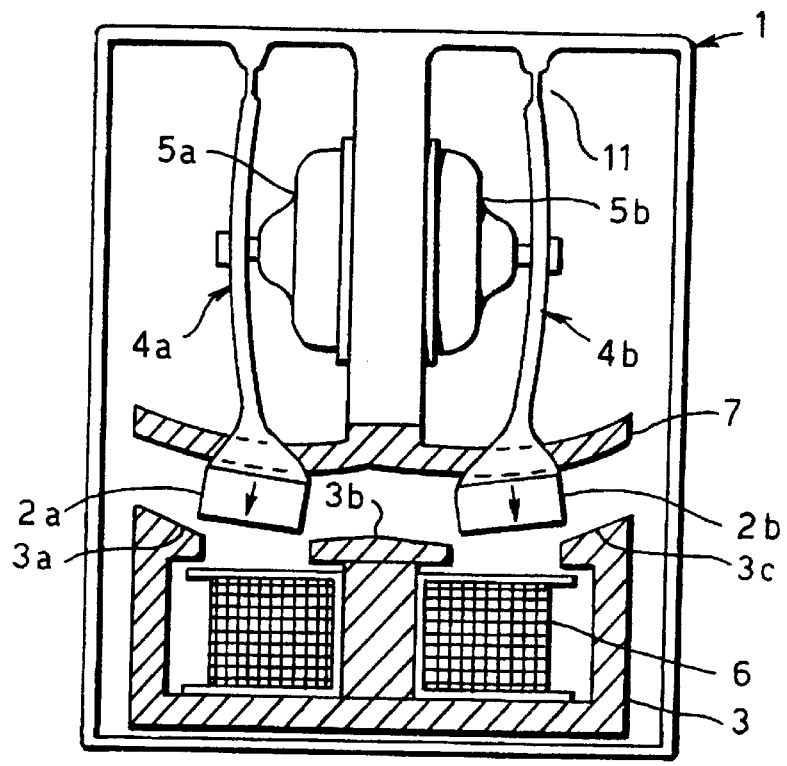
FIG. 1 shows a schematic diagram of the moving-magnet actuator according to a preferred embodiment of the present invention.

Referring to FIG. 1, the preferred embodiment of the actuator 1 has three stator poles 3a, 3b, 3c and two magnet poles, 2a, 2b, two independent arm assemblies 4a, 4b are used to actuate a pair of compressor diaphragms or bellows, 5a, 5b. The stator consists of two soft magnetic components, an E-core 3, which carries the excitation winding 6 and a backing plate 7. The stator structure may be constructed of laminated or solid ferromagnetic material or a suitable mixture.

The E-core limbs or teeth direct flux to three poles at the air-gap, a large main pole 3b, and two side poles 3a, 3c displaced equally from the central tooth by a slot in which is housed the excitation coil 6. The excitation coil 6, located on the central tooth, is supplied by the excitation voltage which may be mains voltage or an alternating voltage source derived from a power supply, or an electronically commutated dc supply. The coil may be pre-wound on a bobbin or former. The coil 6 and stator teeth 3 are arranged so that for a given direction of current in the coil winding the centre pole 3b will produce an excitation field of one polarity in the air-gap region, whilst the outer poles 3a, 3c will produce a field of opposite polarity.

Displaced from the first stator component is a second static member or backing plate 7, of soft magnetic material which is used to improve the field due to the coil 6 by acting as a return path for the flux and to improve the flux travelling in the desired direction normal to the pole surface. The backing plate 7 has an axial dimension comparable with the pole face axial dimension and comparable width as the E-core from the outside edge of the outer teeth. Both dimensions may be slightly increased to improve the backing plate's effectiveness.

In the air-space defined by the stator E-core pole pieces 3a, 3b, 3c and the backing plate 7, are located the permanent magnet members 2a, 2b, which are suspended and movable via the non-magnetic support arms 4a, 4b. The permanent magnets 2a, 2b may be arcs or parallelepiped sections. Although, parallelepiped or rectangular sections may be preferred for cost reasons, the use of arms supporting profiled pole pieces and a backing plate, offers advantages by maintaining a constant air-gap over the radial motion of the magnet. When arc segments are used both radial magnetisation and diametric or parallel magnetisation may be considered. However, for the cost effective rectangular sections parallel magnetisation may be used. The permanent magnet material may be sintered, injection moulded or compression bonded ferrites or rare-earths.

The axes of magnetisation for both magnets, is in a direction normal to the desired motion as shown in FIG. 1, with both magnets presenting similar poles towards the stator. Similar poles allow anti-vibration but could be with opposite magnetisation and have synchronised movement.

The magnets are suspended via two independent non-magnetic pivot-arms 4a, 4b, which allow the magnets 2a, 2b to be displaced along the desired excursion. The arms 4a, 4b are arranged to ensure the magnet 2a, 2b position lies approximately mid-way between the stator 3 and backing plate 7, over the entire excursion.

Figure 2:
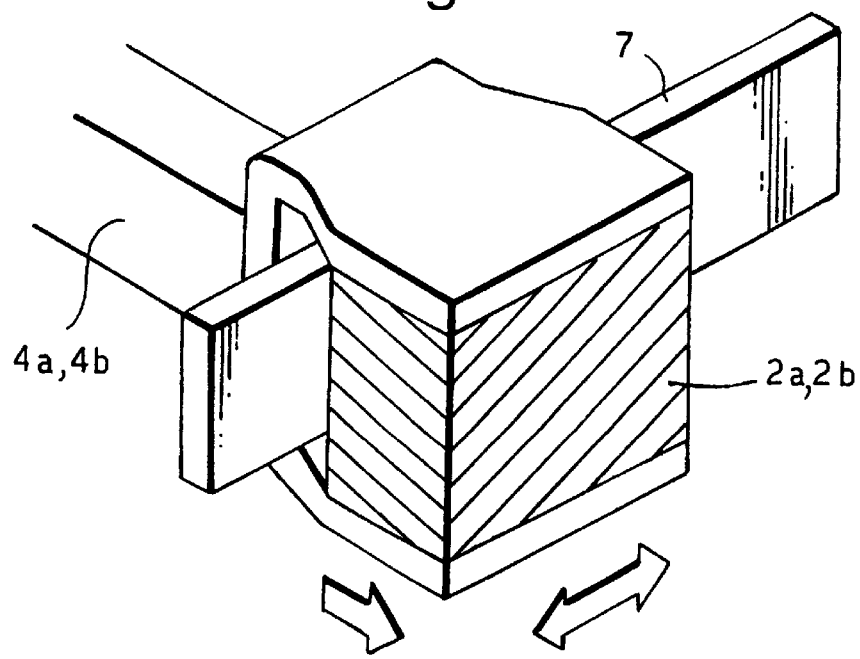
FIG. 2 shows the mounting of one of the permanent magnet poles.

As shown in FIG. 2, the arms 4a, 4b hold the magnets 2a, 2b from above and below so as not to have additional material on the faces parallel to the E-core 3 and backing plate 7. Hence the magnetic air-gap is not increased for a given mechanical clearance. The magnets 2a, 2b may be attached to the arms 4a, 4b with an adhesive or by an over-moulding process or mechanical location method, particularly in the case of plastic moulded magnets which maybe moulded with features for location and clipping to the arms.

To facilitate the limited circular oscillations a pivot point 11 is located at the opposite end of the arm to the magnet. The pivot 11 may be of a flexure of plastic, or a thinning of the rigid plastic arm or a metallic insert may be employed.

Figure 3:
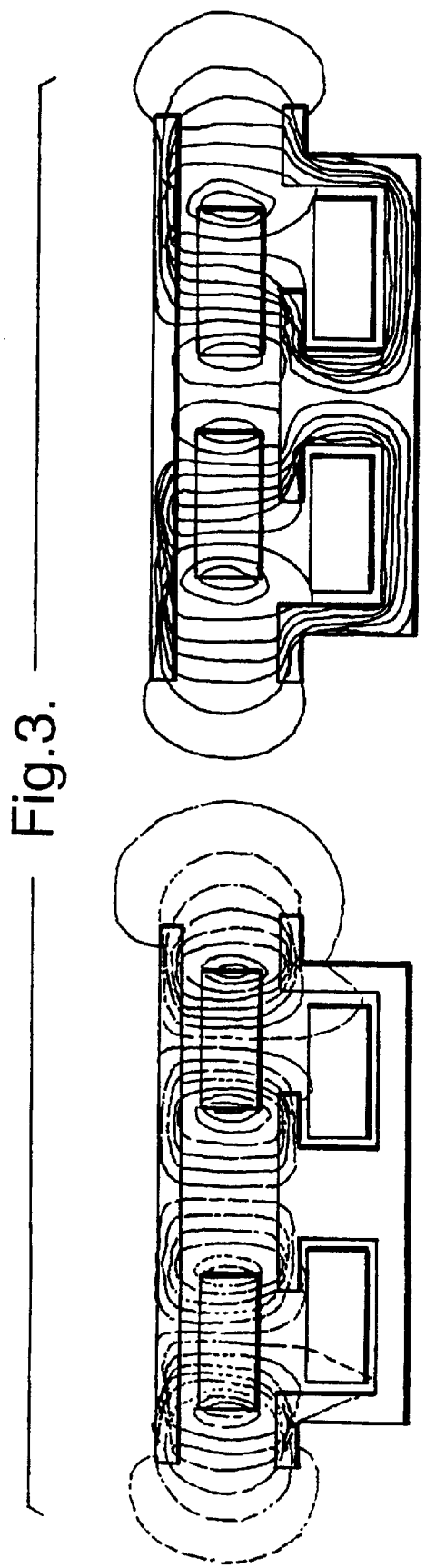
FIG. 3 shows typical field distributions due to the permanent magnets.
Figure 4:
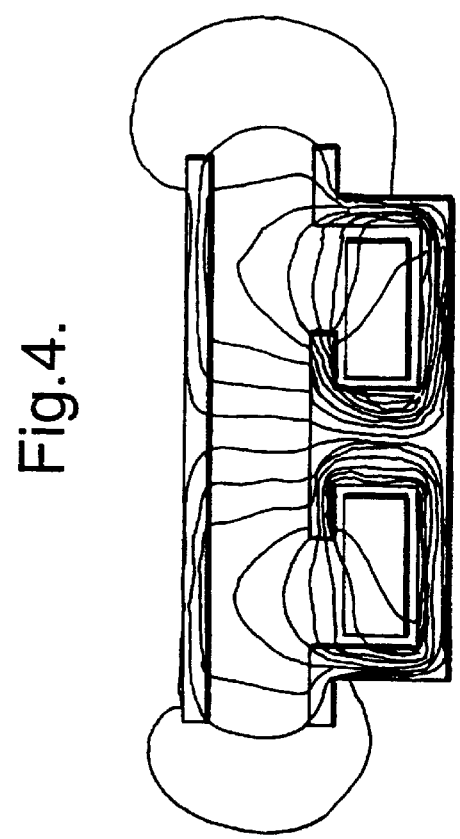
FIG. 4 shows typical field distribution due to coil excitation only.

During operation of the actuator, a dominant flux is produced by the permanent magnets 2a, 2b, the approximate flux paths being shown in FIG. 3. The flux path due to the excitation of the coil 6 alone is shown in FIG. 4.

With no coil current present, a small saliency force is present due to the interaction of the magnet with the salient soft-magnetic structure. The salient force displacement characteristic has an unstable equilibrium position when the magnet is approximately at the mid point of the excursion and midway between the central pole 3b and outer pole 3a or 3c, and the pivot arms 4a, 4b are arranged such that the magnets 2a, 2b lie approximately at this point with zero excitation. This null-point is defined by the position of the flexible pivot points 11, with no external bending forces applied and with central equilibrium of the bellows. For a given direction of coil 6 excitation current, the central pole-piece 3b will produce a field of a certain polarity, whilst the outer poles 3a, 3c will produce a field of opposite polarity. The magnet 2a, 2b will then be attracted to the centre pole 3b and repulsed from the outer pole 3a or 3c in its' vicinity, or vice-versa, due to distortion of the local field and will produce a torque about the pivot point 11, and hence a movement of the arm 4a, 4b, if sufficient force is developed to overcome the stiffness of the pivot points and load force due to the bellows etc. As the magnets displace towards a given pole the flux through the central limb and hence coil, increases rapidly and induces a coil back-mmf. The number of turns on the core are selected to produce the desired coil mmf whilst accounting for the induced coil mmf, and level of supply voltage available. The motion of the magnet 2a, 2b, is limited by the mechanical load, for example the bellows 5a, 5b and the restoring force of the pivot point 11. If no mechanical limitation was present, motion towards the central position motion is limited by either the magnet 2a, 2b 'clashing' or the point at which the magnet 2a, 2b is fully aligned with the pole 3b, and similarly, for the outer poles 3a, 3c. However, the actuator 1 is usually supplied with a sinusoidally varying voltage, and hence the torque varies sinusoidally, reversing cyclically. The force available to accelerate the arm 4a, 4b inertia is then determined from the interaction of the excitation force with the restoring force due to the bellows 5a, 5b and pivot 11, the load force, for example, due to gas compression and the small saliency force. The magnitudes of the forces are chosen to ensure that the arm oscillates over the desired stroke. The inertia and restoring compliance may be selected to the mechanical resonant frequency is coincident with the supply frequency achieving maximum displacement and efficiency.

The pivoted system outlined above is preferable, as it offers a simple support mechanism and allows amplification of output force due to increased leverage at the point the output force is required. For example, if at the approximate midpoint of the arm between magnet and pivot point the bellow/diaphragm or other load is attached, the torque on the arm is given by $$T = F \times L \quad (Nm).$$

The torque may be considered as continuous about the pivot point, therefore the output force is given by, $$F_m F_a L_a \quad (N)$$

$L_m$
$L_a$=Total length of the arm.
$L_m$=Distance to midpoint.

Therefore, the actuator is required to generate a lower force than required for direct actuation, although it has to produce a larger displacement. However, this is not a problem, particularly in resonant actuators.

With respect to the stator a tooth geometry as shown in FIG. 1 is preferred in which a narrow tooth is used and the addition of a large pole face is used. The cross-sectional area of the tooth may be selected to maintain the flux density in the tooth below an acceptable level, to avoid saturation. Whilst allowing for a large slot area and minimum coil end winding a similar technique may be employed at the outer teeth. In the case of a solid stator the back iron and outer teeth may be formed from a single strip to simplify manufacture. The outer pole faces may then be produced by bending this outer strip parallel to the air-gap, taking due account of the associated bending radii. This may be done in bending either towards or away from the central pole, towards the central tooth being preferred as this allows additional slot area for the coil without extending the overall width of the device, and also reducing slot leakage due to the wider slot.

In order to locate the pre-wound coil 6 on the central tooth 3b it is necessary to split the lamination or steel, at the pole piece to allow direct insertion of the coil. This may be done by the use of a separate pole piece mounted on the central tooth once the coil is fitted. Alternatively, the central tooth/pole piece 3b may be a separate assembly which is attached to a C-core component which forms both the back-iron and outer poles. This separate assembly facilitates the use of lower conductivity materials at strategic points particularly susceptible to eddy currents, i.e. the pole pieces and backing plate.

Figure 5:
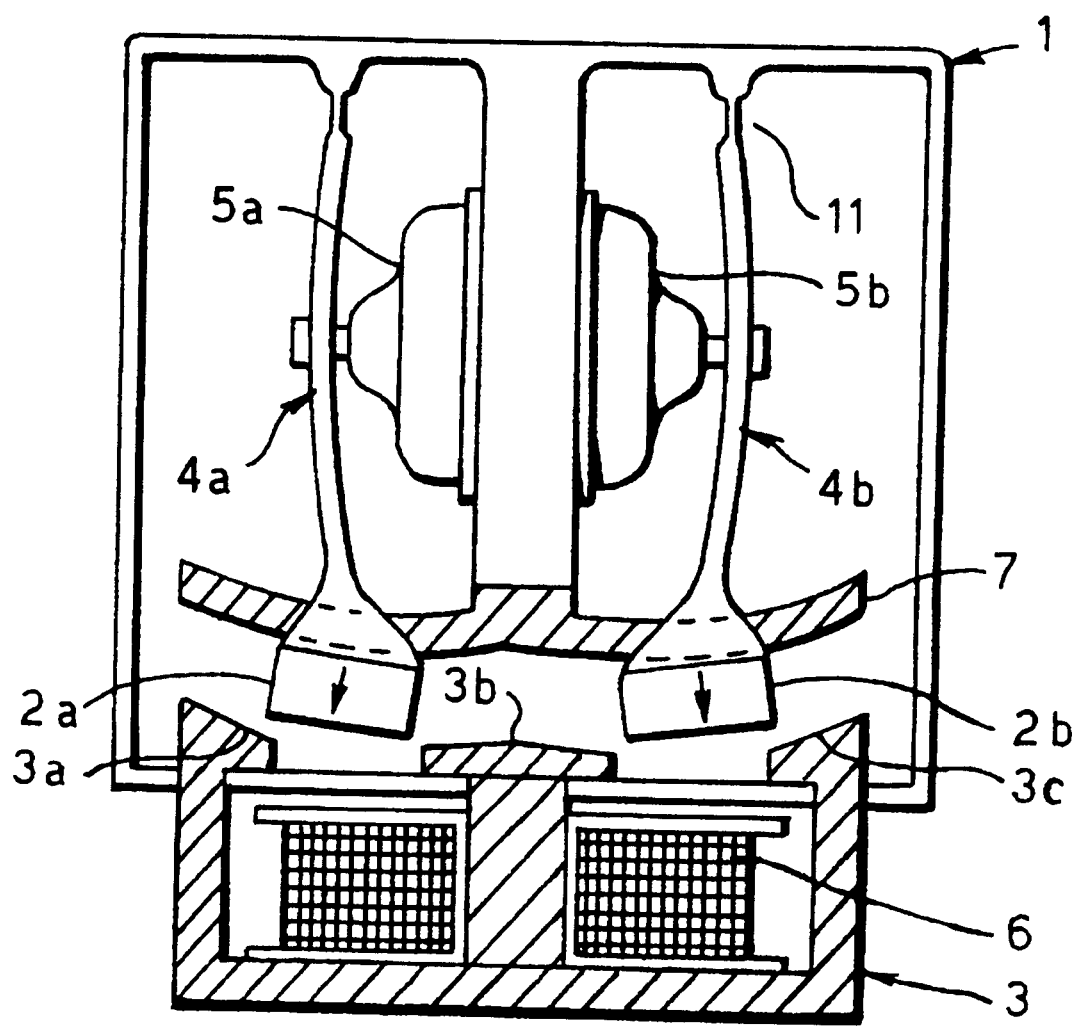
FIG. 5 shows a schematic diagram of another embodiment of the actuator.
Figure 6:
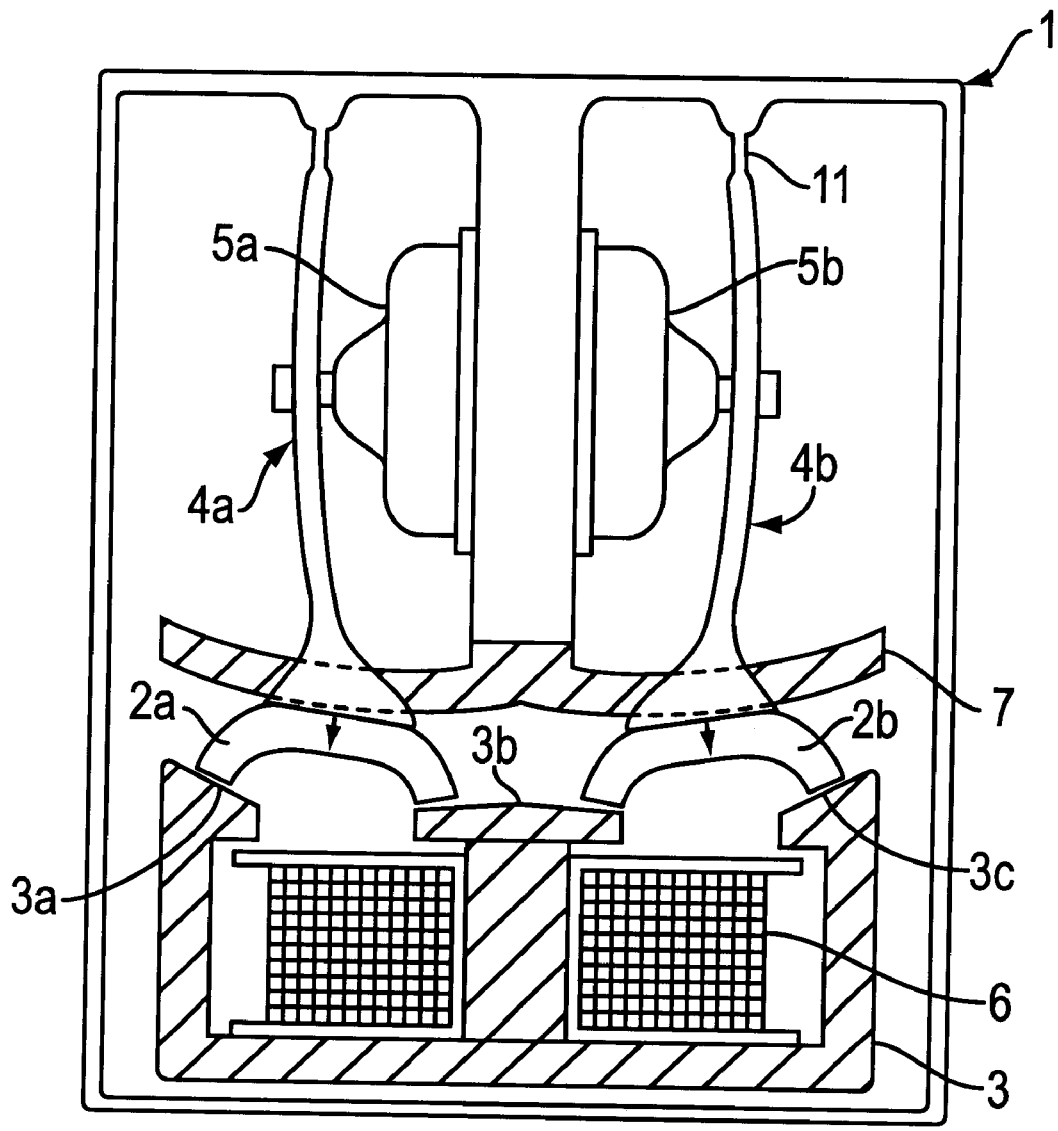
FIG. 6 shows a schematic diagram of the moving-magnet actuator, where the permanent magnets are arc segments.

This use of lower cost magnetic materials, coupled with a E-core structure in which the core may be split results in significant advantages, in the placement of the coil 6 and stator 3. For example, the stator body 3 and coil 6 may be placed outside a casing 12 in which the magnet-arm-bellows are located, as shown in FIG. 5. The pole pieces may be moulded into the case wall, hence ensuring a good pneumatic and acoustic seal, whilst not extending the effective air-gap. The main source of heat, i.e. the excitation coil, is then placed remotely from the temperature sensitive pneumatic components and permanent magnets. Further, the use of a removable coil and centre tooth 3b structure allows the replacement of failed coils and the retro-fitting of different coils required for different global markets.

What is claim is:

1. A magnetic actuator for actuating a member mounted to provide a reciprocating motion in a predetermined direction, said magnetic actuator comprising:
    a permanent magnet assembly for providing at least a pair of permanent magnetic poles having a similar or opposed pole faces adjacent one another and directed perpendicularly with respect to said member;
    an electromagnet having a respective pair of poles located opposite the permanent magnetic poles such that said electromagnet produces movement of the permanent magnetic poles towards each other when said electromagnet is energized; and
    a magnetic backing member for interlinking the permanent magnetic poles to provide a flux return path;
    wherein said magnetic backing member is mounted independently of said magnet assembly.

2. The magnetic actuator as claimed in claim 1, wherein said backing member is located in a stationary position with respect to said electromagnet and parallel to the electromagnet poles to define an air gap in which the permanent magnetic poles are free to oscillate.

3. The magnetic actuator as claimed in claim 2, wherein said backing member is held in a fixed position or, alternatively, an adjustable mounting is used to allow adjustment of the air-gap between said backing member and the permanent magnetic poles to allow adjustment of the output by altering magnetic circuit flux and torque.

4. The magnetic actuator as claimed in claim 1, wherein said backing member comprises an axial dimension that is substantially similar to the permanent magnetic pole face axial dimension.

5. The magnetic actuator as claimed in claim 1, wherein said backing member comprises a backing plate.

6. The magnetic actuator as claimed in claim 5, wherein said backing plate is selectively contoured with a radius or an approximation of a curve, as per the pole faces of said electromagnet, to maintain a desired air-gap over a moving magnet stroke.

7. The magnetic actuator as claimed in claim 5, wherein said backing plate is selected from straight and 'v'-ed.

8. The magnetic actuator as claimed in claim 5, wherein said backing plate is selectively contoured with a radius or an approximation of a curve, as per the pole faces of said electromagnet, to maintain a desired air-gap over a moving magnet stroke.

9. The magnetic actuator as claimed in claim 1, wherein said member is a flexible diaphragm.

10. The magnetic actuator as claimed in claim 9, wherein a link between said permanent magnet assembly and said diaphragm comprises pivotable arms, each arm supporting one of the pair of said permanent magnetic poles respectively.

11. The magnetic actuator as claimed in claim 10, wherein said permanent magnet assembly is mounted such that a magnetic-air gap is not extended.

12. The magnetic actuator as claimed in claim 10, wherein the arms are non-magnetic.

13. The magnetic actuator as claimed in claim 10, wherein the arms and diaphragm are integrated into a single assembly.

14. The magnetic actuator as claimed in claim 1, wherein said permanent magnet assembly comprises magnets of arc segments which are selectively radially or diametrically magnetized.

15. The magnetic actuator as claimed in claim 1, wherein said electromagnet comprises an E stator including outer pole faces extending inwards from outer teeth towards a center pole.

16. The magnetic actuator as claimed in claim 15, wherein said electromagnet comprises pole faces located remote therefrom.

17. The magnetic actuator as claimed in claim 16, wherein the outer pole faces of the stator are molded into a casing ensuring a good pneumatic and acoustic seal, without extending an effective magnetic air-gap.

18. A magnetic actuator for actuating a member mounted to provide a reciprocating motion in a predetermined direction, said magnetic actuator comprising:

a permanent magnet assembly for providing at least a pair of permanent magnetic poles having a similar or opposed pole faces adjacent one another and directed perpendicularly with respect to said member;

an electromagnet having a respective pair of poles located opposite the permanent magnetic poles such that said electromagnet produces movement of the permanent magnetic poles towards each other when said electromagnet is energized; and a magnetic backing member for interlinking the permanent magnetic poles to provide a flux return path;

wherein said magnetic backing member is located in a stationary position with respect to said electromagnet and parallel to the electromagnet poles to define an air gap in which the permanent magnetic poles are free to oscillate.

19. The magnetic actuator as claimed in claim 18, wherein said backing member comprises an axial dimension that is substantially similar to the permanent magnetic pole face axial dimension.

20. The magnetic actuator as claimed in claim 18, wherein said backing member is held in a fixed position or, alternatively, an adjustable mounting is used to allow adjustment of the air-gap between said backing member and the permanent magnetic poles to allow adjustment of the output by altering magnetic circuit flux and torque.

21. The magnetic actuator as claimed in claim 18, wherein said backing member comprises a backing plate.

22. The magnetic actuator as claimed in claim 21, wherein said backing plate is selected from straight and 'v'-ed.

23. The magnetic actuator as claimed in claim 18, wherein said member is a flexible diaphragm.

24. The magnetic actuator as claimed in claim 23, wherein a link between said permanent magnet assembly and said diaphragm comprises pivotable arms, each arm supporting one of the pair of said permanent magnetic poles respectively.

25. The magnetic actuator as claimed in claim 24, wherein said permanent magnet assembly is mounted such that a magnetic-air gap is not extended.

26. The magnetic actuator as claimed in claim 24, wherein the arms are non-magnetic.

27. The magnetic actuator as claimed in claim 24, wherein the arms and diaphragm are integrated into a single assembly.

28. The magnetic actuator as claimed in claim 18, wherein said permanent magnet assembly comprises magnets of arc segments which are selectively radially or diametrically magnetized.

29. The magnetic actuator as claimed in claim 18, wherein said electromagnet assembly comprises an E stator including outer pole faces extending inwards from outer teeth towards a center pole.

30. The magnetic actuator as claimed in claim 29, wherein said electromagnet assembly comprises pole faces located remote therefrom.

31. The magnetic actuator as claimed in claim 30, wherein the outer pole faces of the stator are molded into a casing ensuring a good pneumatic and acoustic seal, without extending an effective magnetic air-gap.

32. The magnetic actuator as claimed in claim 18, wherein said magnetic backing member is mounted independently of said magnet assembly.

* * * * *